Dec. 12, 1944.    F. H. ANDRIX    2,364,933
DYNAMOELECTRIC MACHINE
Filed June 17, 1943
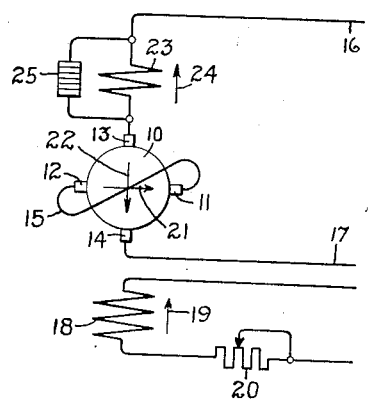
Inventor:
Frank H. Andrix,
by Harry E. Dunham
His Attorney.

Patented Dec. 12, 1944

2,364,933

UNITED STATES PATENT OFFICE 2,364,933

DYNAMOELECTRIC MACHINE

Frank H. Andrix, Niskayuna, N. Y., assignor to General Electric Company, a corporation of New York Application June 17, 1943, Serial No. 491,121

8 Claims. (Cl. 171—223)

My invention relates to dynamoelectric machines and particularly to an arrangement for limiting the maximum load current on an armature reaction excited dynamoelectric machine.

An object of my invention is to provide an arrangement for limiting the maximum current in the secondary or load circuit of an armature reaction excited dynamoelectric machine to substantially a predetermined maximum value.

Another object of my invention is to provide an improved armature reaction excited dynamoelectric machine having a shunt connected across a compensating field exciting winding of the machine for limiting the maximum current through the compensating field exciting winding and the secondary armature circuit of the machine to substantially a predetermined maximum value.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates an armature reaction excited dynamoelectric machine provided with an embodiment of my invention for limiting the maximum load or secondary current of the machine.

Referring to the drawing, I have shown a dynamoelectric machine of the armature reaction excited type which includes an armature 10 having a commutator with a winding connected thereto and a set of commutator primary brushes 11 and 12 and a set of commutator secondary brushes 13 and 14. The primary brushes 11 and 12 are connected together in the illustrated machine by a short-circuiting shunt conductor 15 to provide a primary or short circuit through the armature. The secondary brushes 13 and 14 are displaced substantially 90 electrical degrees from the primary brushes about the commutator and are adapted to be connected by conductors 16 and 17 to a load circuit. As in the conventional machine of this type, a control field exciting winding 18 may be energized by any suitable source of electrical power supply connected across its terminals and controlled by a suitable variable resistor 20 for controlling the energizing current through the winding. In this type machine, the control field exciting winding 18 induces a voltage between the primary brushes 11 and 12, such that a primary or short-circuit current flows through the armature circuit which provides a primary component of armature reaction, indicated by the arrow 21. This component of armature reaction induces a voltage between the secondary brushes 13 and 14 which will cause a current to flow through the secondary circuit of the armature when a load is connected to these brushes. This flow of current through the armature secondary circuit will produce a secondary component of armature reaction, as indicated by the arrow 22, in opposition to the control component of excitation 19. In order to minimize the effect of secondary armature reaction on the control of the machine, a compensating field exciting winding 23 is provided which is energized in response to the secondary current of the machine by being connected in series with the secondary brush 13. This compensating field exciting winding 23 produces a component of excitation along the secondary commutating axis of the machine, as indicated by the arrow 24, in opposition to the secondary component of armature reaction 22, so as substantially to neutralize the secondary armature reaction. In order to limit the maximum secondary or load current through the armature, an inverse voltage-resistance characteristic shunt 25 is connected across the compensating field exciting winding 23, such that when the current through the winding 23 and, therefore, through the secondary armature circuit remains below a predetermined value, the voltage drop across the compensating field exciting winding 23 will be insufficient to cause any appreciable flow of current through the shunt 25. This shunt, however, is constructed such that when the voltage drop across the field exciting winding 23 exceeds a predetermined value and, therefore, the current through this field exciting winding and through the secondary circuit exceeds a predetermined maximum value, the resistance of the shunt 25 will decrease to such a value that an appreciable amount of the armature secondary circuit current will flow through the shunt 25 and by-pass the compensating field exciting winding 23, thereby decreasing the energization of this winding. This decrease in the energization current of the field exciting winding 23 reduces its compensating component of excitation 24, such that the secondary armature reaction 22 is no longer neutralized and opposes the control component of excitation 19, thereby reducing the net excitation along the armature secondary commutating axis. This reduction in the excitation along the secondary commutating axis of the machine reduces the voltage induced between the primary brushes 11 and 12 and, therefore, reduces the current through the armature primary circuit and reduces the primary component of armature reaction 21. A reduction in the excitation due to the primary component of armature reaction reduces the voltage induced between the secondary or load brushes 13 and 14 and, therefore, reduces the secondary or load current of the machine. In this manner, the shunt 25 limits the maximum current which can flow through the compensating field exciting winding 23 and, therefore, limits the maximum current through the armature secondary circuit to substantially a predetermined maximum value.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having an armature with a commutator and a winding connected thereto, means including a commutator primary brush set and a commutator secondary brush set for providing a primary circuit and a secondary circuit through said armature winding, a field exciting winding arranged to provide a component of excitation along the secondary commutating axis of said armature, means including a second field exciting winding for opposing armature reaction due to current in said armature secondary circuit, and means for limiting the current through said second field exciting winding to substantially a predetermined maximum value for limiting the current in said armature secondary circuit to substantially a predetermined maximum value.

2. A dynamoelectric machine having an armature with a commutator and a winding connected thereto, means including a commutator primary brush set and a commutator secondary brush set for providing a primary circuit and a secondary circuit through said armature winding, a control field exciting winding arranged to provide a component of excitation along the secondary commutating axis of said armature, means including a compensating field exciting winding arranged to provide a component of excitation along the armature secondary commutating axis responsive to current in said secondary circuit for opposing armature reaction due to current in said armature secondary circuit, and means for limiting the current through said compensating field exciting winding to substantially a predetermined maximum value.

3. A dynamoelectric machine having an armature with a commutator and a winding connected thereto, means including a commutator primary brush set and a commutator secondary brush set for providing a primary circuit and a secondary circuit through said armature winding, a control field exciting winding arranged to provide a component of excitation along the secondary commutating axis of said armature, means including a compensating field exciting winding for opposing armature reaction due to current in said armature secondary circuit, and means for limiting the current through said compensating field exciting winding to substantially a predetermined maximum value and for reducing the net excitation along the armature secondary commutating axis to limit the maximum current through said armature secondary circuit to substantially a predetermined value.

4. A dynamoelectric machine having an armature with a commutator and a winding connected thereto, means including a commutator primary brush set and a commutator secondary brush set for providing a primary circuit and a secondary circuit through said armature winding, a control field exciting winding arranged to provide a component of excitation along the secondary commutating axis of said armature, means including a compensating field exciting winding arranged to provide a component of excitation along the armature secondary commutating axis for opposing armature reaction due to current in said armature secondary circuit, and means for limiting the current through said compensating field exciting winding to substantially a predetermined maximum value and for reducing the compensating component of excitation of said compensating field exciting winding above a predetermined maximum current therethrough for reducing the net excitation along the armature secondary commutating axis.

5. A dynamoelectric machine having an armature with a commutator and a winding connected thereto, means including a commutator primary brush set and a commutator secondary brush set for providing a primary circuit and a secondary circuit through said armature winding, a control field exciting winding arranged to provide a component of excitation along the secondary commutating axis of said armature, means including a compensating field exciting winding connected in series with said secondary armature circuit and arranged to provide a component of excitation along the armature secondary commutating axis responsive to current in said secondary circuit for opposing armature reaction due to current in said armature secondary circuit, and means including a shunt connected across said compensating field exciting winding for limiting the current through said compensating field exciting winding to substantially a predetermined maximum value and thereby limit the maximum current through said armature secondary circuit.

6. A dynamoelectric machine having an armature with a commutator and a winding connected thereto, means including a commutator primary brush set and a commutator secondary brush set for providing a primary circuit and a secondary circuit through said armature winding, a control field exciting winding arranged to provide a component of excitation along the secondary commutating axis of said armature, means including a compensating field exciting winding arranged to provide a component of excitation along the armature secondary commutating axis responsive to current in said armature secondary circuit for opposing armature reaction due to current in said armature secondary circuit, and means including an inverse voltage-resistance characteristic shunt connected across said compensating field exciting winding for limiting the current through said compensating field exciting winding to substantially a predetermined maximum value for limiting the current in said armature secondary circuit to substantially a predetermined maximum value.

7. A dynamoelectric machine having an armature with a commutator and a winding connected thereto, means including a commutator primary brush set and a commutator secondary brush set for providing a primary circuit and a secondary circuit through said armature winding, a control field exciting winding arranged to provide a component of excitation along the secondary commutating axis of said armature, means including a compensating field exciting winding arranged to provide a component of excitation along the armature secondary commutating axis for opposing armature reaction due to current in said armature secondary circuit, and means including a shunt connected across said compensating field exciting winding for limiting the current through said compensating field exciting winding to substantially a predetermined maximum value and for reducing the compensating component of excitation of said compensating field exciting winding above a predetermined maximum current therethrough for reducing the net excitation along the armature secondary commutating axis.

8. A dynamoelectric machine having an armature with a commutator and a winding connected thereto, means including a commutator primary brush set and a commutator secondary brush set for providing a primary circuit and a secondary circuit through said armature winding, a control field exciting winding arranged to provide a component of excitation along the secondary commutating axis of said armature, means including a compensating field exciting winding connected in series with said secondary armature circuit and arranged to provide a component of excitation along the armature secondary commutating axis responsive to current in said secondary circuit for opposing armature reaction due to current in said armature secondary circuit, and means including an inverse voltage-resistance characteristic shunt connected across said compensating field exciting winding for limiting the current through said compensating field exciting winding to substantially a predetermined maximum value and for reducing the compensating component of excitation of said compensating field exciting winding above a predetermined maximum current therethrough for reducing the net excitation along the armature secondary commutating axis.

FRANK H. ANDRIX.